(12) United States Patent
Wojsznis et al.

(10) Patent No.: US 7,272,454 B2
(45) Date of Patent: Sep. 18, 2007

(54) MULTIPLE-INPUT/MULTIPLE-OUTPUT CONTROL BLOCKS WITH NON-LINEAR PREDICTIVE CAPABILITIES

(75) Inventors: Wilhelm K. Wojsznis, Austin, TX (US); Terrence L. Blevins, Round Rock, TX (US); Ashish Mehta, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 253 days.

(21) Appl. No.: 10/454,937

(22) Filed: Jun. 5, 2003

(65) Prior Publication Data

US 2004/0249483 A1    Dec. 9, 2004

(51) Int. Cl.
*G05B 13/02* (2006.01)
(52) U.S. Cl. .............. 700/29; 700/28; 700/31; 700/44; 700/53
(58) Field of Classification Search .......... 700/8, 700/28–29, 31–32, 37, 44–45, 48, 50, 53
See application file for complete search history.

(56) References Cited

U.S. PATENT DOCUMENTS

| | | | | |
|---|---|---|---|---|
| 5,353,207 A | * | 10/1994 | Keeler et al. | 700/44 |
| 5,519,605 A | * | 5/1996 | Cawlfield | 700/31 |
| 5,568,378 A | * | 10/1996 | Wojsznis | 700/44 |
| 5,841,652 A | * | 11/1998 | Sanchez | 700/44 |
| 5,933,345 A | | 8/1999 | Martin et al. | 364/164 |
| 6,047,221 A | | 4/2000 | Piche et al. | 700/44 |
| 6,278,899 B1 | | 8/2001 | Piche et al. | 700/44 |
| 6,381,504 B1 | * | 4/2002 | Havener et al. | 700/44 |
| 6,445,963 B1 | | 9/2002 | Blevins et al. | 700/44 |
| 6,487,459 B1 | | 11/2002 | Martin et al. | 700/44 |
| 6,587,744 B1 | * | 7/2003 | Stoddard et al. | 700/121 |
| 6,757,570 B1 | * | 6/2004 | Calise et al. | 700/45 |
| 6,901,300 B2 | * | 5/2005 | Blevins et al. | 700/46 |
| 7,039,475 B2 | * | 5/2006 | Sayyarrodsari et al. | 700/31 |
| 2004/0049299 A1 | * | 3/2004 | Wojsznis et al. | 700/29 |
| 2004/0117040 A1 | * | 6/2004 | Sayyarrodsari et al. | 700/29 |

(Continued)

OTHER PUBLICATIONS

Qin, et al., "*An Overview of Industrial Model Predictive Control Technology*", pp. 232-256 (1996).

(Continued)

*Primary Examiner*—Anthony Knight
*Assistant Examiner*—Jennifer L. Norton
(74) *Attorney, Agent, or Firm*—Marshall Gerstein & Borun LLP

(57) ABSTRACT

A process controller that may be used to control a process having a set of process outputs effected by a set of process control input signals includes a multiple-input/multiple output controller that uses the process outputs to develop the set of process control input signals and a process model, which may be a non-linear process model, that receives the set of process control input signals to produce a prediction signal for one or more of the process outputs. The multiple-input/multiple-output control element includes another process model, which may be a standard linear process model, to develop a prediction vector for each of the process outputs and includes a correction unit that modifies the prediction vector for the one or more of the process outputs using the prediction signal for the one or more of the process outputs to thereby compensate for the non-linearities of the process.

38 Claims, 6 Drawing Sheets

U.S. PATENT DOCUMENTS

2005/0149209 A1* 7/2005 Wojsznis et al. .............. 700/30
2007/0088448 A1* 4/2007 Mylaraswamy et al. ...... 700/44

OTHER PUBLICATIONS

U.S. Appl. No. 10/241,350, entitled "Integrated Model Predictive Control and Optimization in a Process Control System", filed Sep. 11, 2002.

Qin, S.J. and Badgwell, T.A., "An Overview of Nonlinear MPC Applications," NMPC Workshop, Ascona, Switzerland, Jun. 3-6, 1998.

Piche, Stephen, Pavilion Technologies, "Nonlinear Model Predictive Control Using Neural Networks," UCSB Control Consortium Meeting, 1999.

Jan M. Maciejowski, "Model Predictive Control with Constraints," Pearson Education Limited, Appendix A, Appendix B, 2002.

Aspentech, "Aspen IQ™—Inferred Quality for Advanced Control and Monitoring," Product Brochure, date unknown.

* cited by examiner

MULTIPLE-INPUT/MULTIPLE-OUTPUT CONTROL BLOCKS WITH NON-LINEAR PREDICTIVE CAPABILITIES

FIELD OF TECHNOLOGY

The present invention relates generally to process control systems and, more particularly, to the use of advanced control blocks, such as model predictive control blocks or optimizers, in process control systems having non-linear response characteristics.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other of information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamp) signals to and from the process controller via an analog bus or analog lines. These 4 to 20 ma signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, WORLDFIP®, Device-Net®, and CAN protocols, have been developed to enable smart field devices made by different manufacturers to be used together within the same process control network. Moreover, the all-digital, two-wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In this case, the Fieldbus field devices are capable of storing and executing one or more function blocks, each of which receives inputs from and/or provides outputs to other function blocks (either within the same device or within different devices), and performs some process control operation, such as measuring or detecting a process parameter, controlling a device or performing a control operation, like implementing a proportional-derivative-integral (PID) control routine. The different function blocks within a process control system are configured to communicate with each other (e.g., over a bus) to form one or more process control loops, the individual operations of which are spread throughout the process and are, thus, decentralized.

In any event, the process controllers (or field devices) are typically programmed to execute a different algorithm, subroutine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and a single output block, such as an analog output (AO) function block. These control loops typically perform single-input/single-output control because the control block creates a single output used to control a single process input, such as a valve position, etc. However, in certain cases, the use of a number of independently operating, single-input/single-output control loops is not very effective because the process variables or process outputs being controlled are effected by more than a single process input and, in fact, each process input may effect the state of many process outputs. An example of this might occur in, for example, a process having a tank being filled by two input lines, and being emptied by a single output line, each line being controlled by a different valve, and in which the temperature, pressure and throughput of the tank are being controlled to be at or near desired values. As indicated above, the control of the throughput, the temperature and the pressure of the tank may be performed using a separate throughput control loop, a separate temperature control loop and a separate pressure control loop. However, in this situation, the operation of the temperature control loop in changing the setting of one of the input valves to control the temperature within the tank may cause the pressure within the tank to increase, which, for example, causes the pressure loop to open the outlet valve to decrease the pressure. This action may then cause the throughput control loop to close one of the input valves, thereby effecting the temperature and causing the temperature control loop to take some other action. As will be understood in this example, the single-input/single-output control loops may cause the process outputs (in this case, throughput, temperature and pressure) to oscillate without ever reaching a steady state condition, which is undesirable.

Model predictive control (MPC) or other types of advanced control have been used in the past to perform control in these types of situations. Generally speaking, model predictive control is a multiple-input/multiple output control strategy in which the effects of changing each of a number of process inputs on each of a number of process outputs is measured and these measured responses are then used to create a typically linear model of the process. The linear model of the process is inverted mathematically and is then used as a multiple-input/multiple-output controller to control the process outputs based on changes made to the process inputs. In some cases, the process model includes a process output response curve for each of the process inputs and these curves may be created based on a series of, for example, pseudo-random step changes delivered to each of the process inputs. These response curves can be used to model the process in known manners. Model predictive control is known in the art and, as a result, the specifics thereof will not be described herein. However, model predictive control is described generally in Qin, S. Joe and Thomas A. Badgwell, "An Overview of Industrial Model Predictive Control Technology," *AIChE Conference*, 1996. Furthermore, U.S. Pat. No. 6,445,963, the disclosure of which is hereby expressly incorporated by reference herein, discloses a method of integrating a model predictive control block into a process control system for use in controlling a process.

While model predictive control blocks work well in standard processes with behaviors that can be generally modeled using linear techniques, it is difficult to use model predictive control blocks to control processes (or using process outputs) that exhibit non-linear behavior or that have a non-linear relationship with respect to the control inputs delivered to the process. In general, it is believed that MPC applications for non-linear processes would need to be adapted to provide non-linear optimization, to include non-linear controller generation and to use non-linear models instead of linear models within the MPC block. For example, it is known to provide non-linear modeling in series with a linear MPC technique to thereby adapt the inputs to the MPC block or the control outputs of the MPC block for non-linear processes. Such non-linear modeling may take the form of first principle models, high fidelity simulation, a mixture of non-linear gains and linear dynamics (Wiener or Hammerstein models) or neural network models. Additionally, it is known to adapt an MPC technique to include non-linear capability by using a neural network to recalculate the process model gains during each scan of the process control routine. However, gain recalculation is complex, involves calculation of derivatives from the process model resulting in additional modeling errors, can be computationally expensive and quite time consuming to implement. Thus, these methods of MPC adaptation are difficult and complex to implement within the MPC logic and may not be truly justified or practical in most process plant situations.

While these problems exist for model predictive controllers, the same or similar problems exist in the development and use of other advanced multiple-input/multiple output control blocks or systems, such as neural network controllers, multi-variable fuzzy logic controllers, real time optimizers, etc.

SUMMARY OF THE DISCLOSURE

A multiple input/multiple-output control routine, such as a model predictive control routine, includes a generally linear process model that produces a prediction vector for one or more process outputs and a non-linear process model that produces a prediction signal, which may be a prediction vector or a steady state prediction value, to be used to correct the prediction vector for the one or more of the process outputs. The corrected prediction vector is then used in a normal manner to produce a set of control signals for controlling the process. The non-linear process model and the advanced control routine, such as the model predictive control routine, may be developed and operated in known and relatively simple manners which makes this system easy to implement and use when controlling a process having non-linear characteristics. Further, this system does not need to be modified to integrate a non-linear model into an multiple-input/multiple-output control block or to recalculate the controller gains used by the multiple-input/multiple-output control block. Furthermore, the non-linear process model is easy to develop (as it will generally reflect or model the non-linear nature of one output to one or more inputs) and may generally remain the same throughout operation of the process.

In one embodiment, a process controller adapted to be used to control a process having a set of process outputs effected by a set of process control input signals includes a multiple-input/multiple-output controller adapted to receive an indication of the process outputs to develop the set of process control input signals and a process model, which may be a non-linear process model, adapted to receive the set of process control input signals to produce a prediction signal for one of the process outputs. The multiple-input/multiple-output control element, which may be a controller, an optimizer, etc., includes another process model, which may be a standard linear process model, that develops a prediction vector for each of the process outputs and a correction unit adapted to modify the prediction vector for the one of the process outputs using the prediction signal for the one of the process outputs to thereby adjust for the non-linearities of the process.

DETAILED DESCRIPTION

Figure 1:
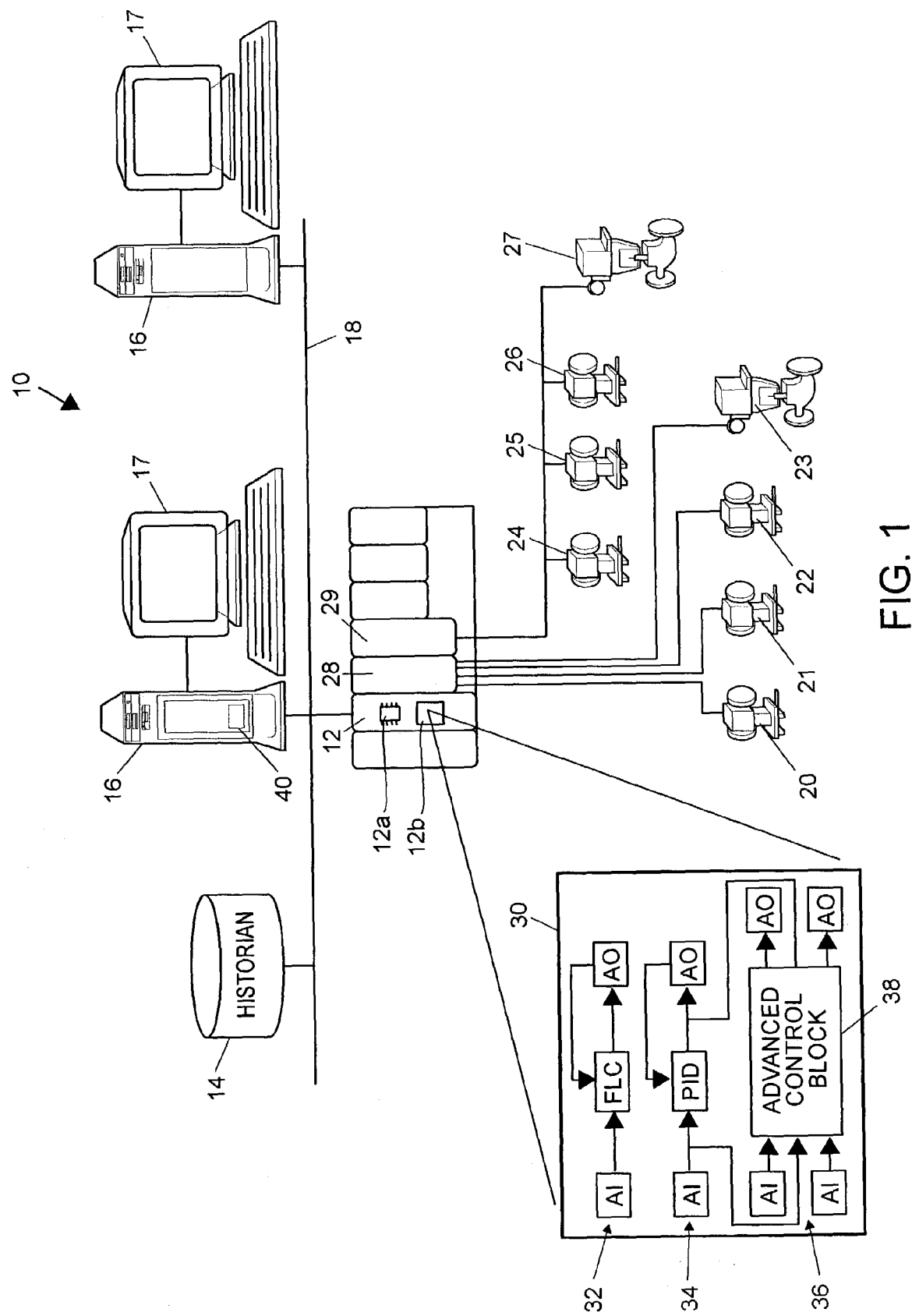
FIG. 1 is a block/schematic diagram of a process control system incorporating an advanced control system having a multiple-input/multiple output control block adapted to include non-linear predictive capabilities.

Referring now to FIG. 1, a process control system 10 includes a process controller 12 connected to a data historian 14 and to one or more host workstations or computers 16 (which may be any type of personal computers, workstations, etc. each having a display screen 17), via a communications network 18. The controller 12 is also connected to field devices 20-27 via input/output (I/O) cards 28 and 29. The communications network 18 may be, for example, an Ethernet communications network or any other suitable or desirable communications network while the data historian 14 may be any desired type of data collection unit having any desired type of memory and any desired or known software, hardware or firmware for storing data. The controller 12, which may be, by way of example, the DeltaV™ controller sold by Fisher-Rosemount Systems, Inc., is communicatively connected to the field devices 20-27 using any desired hardware and software associated with, for example, standard 4-20 ma devices and/or any smart communication protocol such as the Fieldbus protocol, the HART protocol, etc.

The field devices 20-27 may be any types of devices, such as sensors, valves, transmitters, positioners, etc. while the I/O cards 28 and 29 may be any types of I/O devices conforming to any desired communication or controller protocol. In the embodiment illustrated in FIG. 1, the field devices 20-23 are standard 4-20 ma devices that communicate over analog lines to the I/O card 28 or are HART devices that communicate over combined analog and digital lines to the I/O card 28 while the field devices 24-27 are smart devices, such as Fieldbus field devices, that communicate over a digital bus to the I/O card 29 using Fieldbus protocol communications. Generally speaking, the Fieldbus protocol is an all-digital, serial, two-way communication protocol that provides a standardized physical interface to a two-wire loop or bus which interconnects field devices. The Fieldbus protocol provides, in effect, a local area network for field devices within a process, which enables these field devices to perform process control functions (using function blocks defined according to the Fieldbus protocol) at locations distributed throughout a process facility and to communicate with one another before and after the performance of these process control functions to implement an overall control strategy. Of course, the field devices 20-27 could conform to any other desired standards or protocols, including any standards or protocols developed in the future.

The controller 12 includes a processor 12a that implements or executes one or more process control routines, which may include control loops, stored in a computer readable memory 12b therein or otherwise associated therewith and communicates with the devices 20-27, the host computers 16 and the data historian 14 to control a process in any desired manner. It should be noted that any control routines or elements described herein may have parts thereof implemented or executed by processors in different controllers or other devices, such as one or more of the field devices 24-27 if so desired. Likewise, the control routines or elements described herein to be implemented within the process control system 10 may take any form, including software, firmware, hardware, etc. For the purpose of this invention, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. As a result, it will be understood that the controller 12 may be configured to implement a control strategy or control routine in any desired manner.

In one embodiment, the controller 12 implements a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 12, which is typically the case when these function blocks are used for, or are associated with standard 4-20 ma devices and some types of smart field devices such as HART devices, or may be stored in and implemented by the field devices themselves, which can be the case with Fieldbus devices. While the description of the control system is provided herein using a function block control strategy, the control strategy or control loops or modules could also be implemented or designed using other conventions, such as ladder logic, sequential function charts, etc. or using any other desired programming language or paradigm.

As illustrated by the exploded block 30 of FIG. 1, the controller 12 may include a number of single-loop control routines, illustrated as routines 32 and 34, and, if desired, may implement one or more advanced control loops, illustrated as a control loop 36. Each such loop is typically referred to as a control module. The single-loop control routines 32 and 34 are illustrated as performing signal loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control system 38 having inputs communicatively connected to numerous AI function blocks and outputs communicatively connected to numerous AO function blocks, although the inputs and outputs of the advanced control system 38 may be connected to any other desired function blocks or control elements to receive other types of inputs and to provide other types of control outputs. The advanced control system 38, which is adapted to control processes exhibiting non-linear input/output characteristics as described in more detail herein, generally includes any type of multiple-input/multiple-output control routine (typically used to control two or more process outputs by providing control signals to two or more process inputs) and one or more non-linear or advanced process models which are developed to accurately model the non-linear characteristics of the process. Thus, while the advanced control system 38 will be described herein as using a model predictive control (MPC) block, the advanced control system 38 could incorporate or use any other multiple-input/multiple-output block, such as a neural network-control block, a multi-variable fuzzy logic control block, a real-time optimizer block, etc.

It will be understood that the function blocks illustrated in FIG. 1, including the advanced control system 38 which can be implemented as one or more interconnected function blocks, can be executed by the controller 12 or, alternatively, can be located in and executed by any other processing device, such as one of the workstations 16 or even one of the field devices 24-27.

As illustrated in FIG. 1, one of the workstations 16 includes an advanced control block generation routine 40 that may be used to create, download and implement the advanced control system 38 essentially in a manner as described in U.S. Pat. No. 6,445,963, which is assigned to the assignee hereof and which is hereby expressly incorporated by reference herein. The only difference is that, in the creation of the advanced control system 38, the routine 40 may also be used to create and download one or more non-linear process models, such as one or more neural network process models, as part of the advanced control system 38 communicatively connected to an MPC control block as described in detail herein with respect to FIGS. 2-6. While the advanced control block generation routine 40 may be stored in a memory within the workstation 16 and executed by a processor therein, this routine (or any part thereof) may additionally or alternatively be stored in and executed by any other device within the process control system 10, if so desired.

Figure 2:
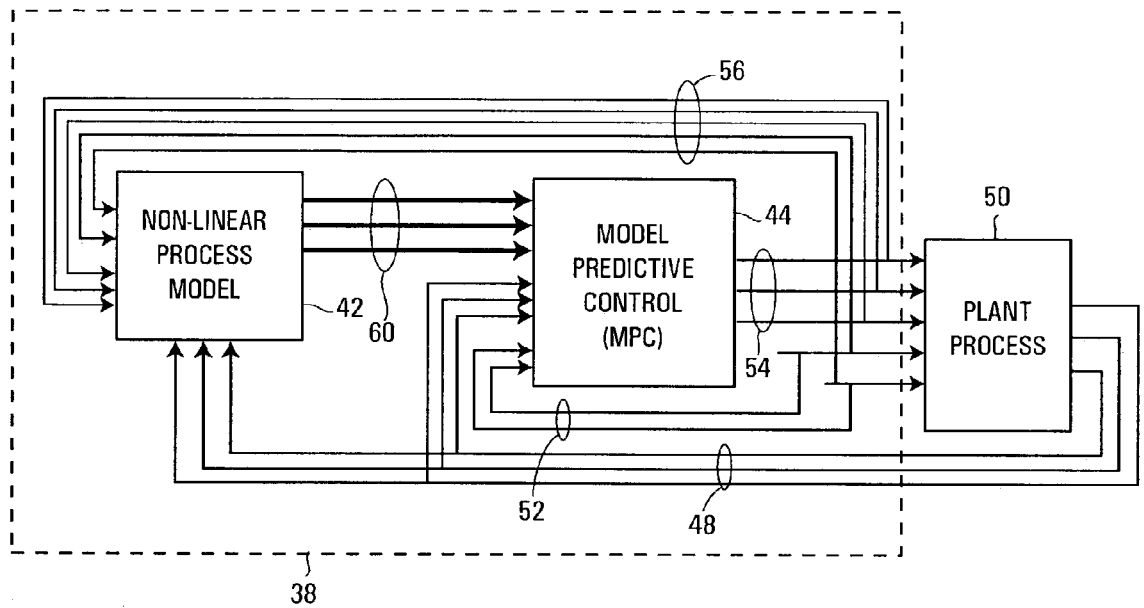
FIG. 2 is a block diagram of one embodiment of the advanced control system of FIG. 1 having a model predictive control block and a neural network process model connected within a process control routine to control a process exhibiting non-linear input/output characteristics.

FIG. 2 is a block diagram illustrating one embodiment of the advanced control system 38 communicatively connected to a process. Generally speaking, the advanced control system 38 of FIG. 2 includes a non-linear process model 42, which may be a steady-state non-linear process model, communicatively coupled to a multiple-input/multiple-output control block which, in this case, is illustrated as an MPC control block 44. Process outputs 48 (which may be control and constraint measurements or parameters) of a process plant 50 are fed back to the input of the MPC block 44 as is typical in MPC control. Likewise, a set of measured or known process disturbance inputs 52 are provided to both the process plant 50 and to the input of the MPC block 44, as is also typical in known MPC techniques. The MPC control block 44 may include standard MPC logic having a linear process model therein and may generally operate in a typical or known manner to develop a set of process control signals or manipulated variable control signals 54, except that the MPC block 44 uses one or more prediction signals developed by the non-linear process model 42 to compensate for the non-linear nature of the process 50. As illustrated in FIG. 2, the non-linear process model 42 receives, as inputs thereto, a set of various inputs 56 to the process plant 50 including the manipulated variable control signals 54 developed by the MPC block 44 and the disturbance inputs 52 provided to the process 50. The process model 42 may also receive the process outputs 48 which the process model 42 may use to perform model output adjustment based on the current outputs of the process 50. The non-linear process model 42 which may be, for example, a neural network process model, uses the inputs 56 and a process model that more accurately models the non-linear input/output characteristics of the process 50 to produce one or more prediction signals 60, and provides these prediction signals 60 to the MPC block 44. The MPC block 44 uses standard MPC logic, in conjunction with the prediction signals 60, which may be steady state prediction signals or prediction vectors predicting the multiple future values for one or more of the process outputs 48, to develop a more a accurate or useful set of manipulated variable control signals 54 to control the process in spite of the presence of non-linear process characteristics.

While the non-linear process model 42 is illustrated in FIG. 2 as providing three prediction signals 60 to the MPC block 44, the process model 42 could provide any other number of prediction signals, including only one prediction signal 60, to the MPC block 44. Of course, the actual number of outputs of the non-linear model 42 that will be provided to and used by the MPC block 44 will be dependent on the non-linear nature of the process 50 or, more specifically, the non-linear relationship between one or more of the process inputs 52 and 54 and the process outputs 48.

Figure 3:
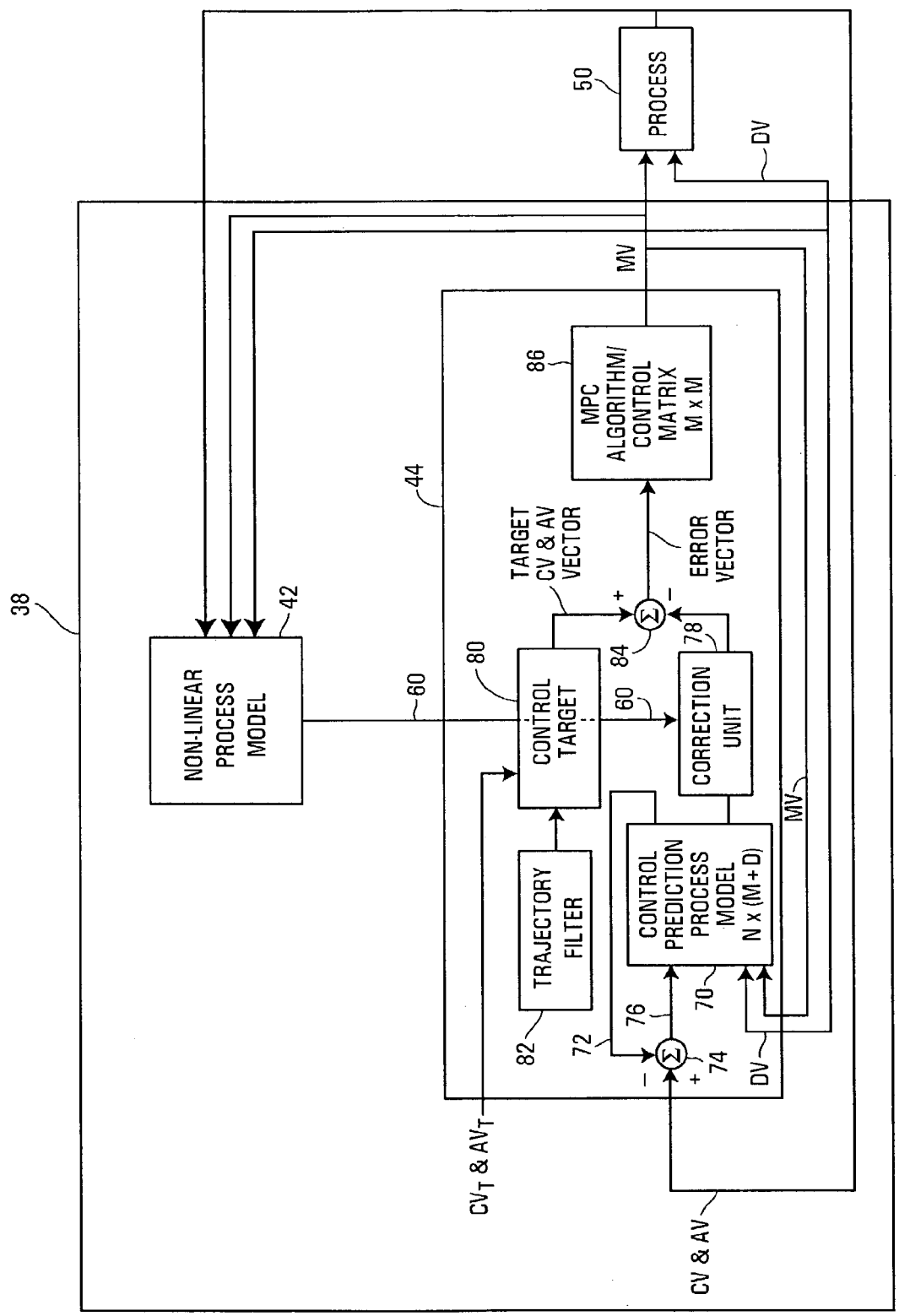
FIG. 3 is a detailed block diagram of the advanced control system of FIG. 2.

FIG. 3 illustrates the MPC block 44 in more detail when connected to the non-linear process model 42 and to the process 50. The MPC block 44 illustrated in FIG. 3 may be, for example, any standard, square M by M (where M can be any number equal or greater than one) MPC routine or procedure having the same number of inputs as outputs. If desired, however, the MPC block 44 could be non-square, i.e., having a different number of inputs than outputs. The MPC block 44 of FIG. 3 receives, as inputs, a set of N control and auxiliary variables CV and AV (which are vectors of values) as measured within the process 50, a set of disturbance variables DV which are known or expected changes or disturbances provided to the process 50 at some time in the future and a set of steady state target control and auxiliary variables $CV_T$ and $AV_T$ (e.g., set points) provided from any desired source, such as an operator, an optimizer, etc. The MPC block 44 uses these inputs to create the set of M manipulated variable signals MV (in the form of control signals) and delivers the manipulated variable signals MV to control the process 50 as process inputs, it being understood that the MPC block 44 may produce the set of manipulated variable signals MV in any desired form and that the manipulated variable signals MV that may be provided to other function blocks which, in turn, may be connected to control inputs of the process 50 in any desired manner.

As is known, the MPC block 44 includes a control prediction process model 70, which may be an N by M+D step response matrix (where N is the number of control variables CV (process outputs) plus the number of auxiliary variables AV, M is the number of manipulated variables MV and D is the number of disturbance variables DV). The control prediction process model 70 produces on an output line 72 a previously calculated prediction for each of the control and auxiliary variables CV and AV and a vector summer 74 subtracts these predicted values for the current time from the actual measured values of the control and auxiliary variables CV and AV to produce an error or correction vector on an input 76.

The control prediction process model 70 then uses an N by M+D step response matrix (which may include a time response of each of the N process outputs to each of the M+D process inputs in response to a step change in the process inputs) to predict a future control parameter for each of the process outputs over the prediction horizon based on the disturbance and manipulated variables provided to other inputs of the control prediction process model 70. The control prediction process model 70, which is generally a linear process model having a transfer function that defines the response of each process output to each of the process inputs, also produces predicted steady state values of the process outputs at the end of the prediction horizon. The set of predicted values for each of the process outputs up to and including the prediction horizon is a prediction vector for that process output. However, because these prediction vectors are based on a linear or step response model, this prediction vector does not take into account or model any non-linear characteristics or relationships between particular process outputs and process inputs. In particular, the relationship between one of the process inputs and the process outputs may not be able to be accurately modeled using a linear or step response curve as is typically performed by the process model block 70. Thus, when one or more of the process outputs exhibits a non-linear relationship to one or more of the process inputs, the prediction vector developed by the process model block 70 is inaccurate due to these un-modeled non-linearities.

To compensate for such non-linearities, a correction or compensation unit 78 receives and uses the prediction signals 60 (which may each be a single steady state prediction value or a prediction vector having multiple prediction values at different times in the future) developed by the non-linear process model 42 and produces a compensated prediction vector that incorporates or accounts for the process non-linearities for each of the non-linear control and auxiliary variables (process outputs). It will be understood that the correction unit 78 may correct each control or auxiliary variable prediction vector (i.e., each process output prediction vector) separately using a different prediction signal 60 developed by the non-linear process model 42. Additionally, the correction unit 78 need only compensate the prediction vectors for process outputs that exhibit a non-linear relationship with one or more of the process inputs while leaving the prediction vectors as developed by the linear prediction process model 70 for each of the other linear process outputs unaltered. In this case, for example, the non-linear process model 42 may develop a separate or different prediction signal 60 for each of a sub-set of the control and auxiliary variables (process outputs used by MPC block 44 which exhibit a non-linear relationship with one or more of the process inputs (the manipulated or disturbance variables) and the correction unit 78 may compensate each of the prediction vectors for the process outputs within the subset separately while leaving the other process output prediction vectors as developed by the control prediction process model 70 unaltered.

The MPC block 44 also includes a control target block 80 that determines a control target vector for each of the N target control and auxiliary variables $CV_T$ and $AV_T$ (the target process outputs) provided thereto using a trajectory filter 82 previously established for the block 38. In particular, the trajectory filter 82 may provide a unit vector defining the manner in which control and auxiliary variables are to be driven to their target values over time. The control target block 80 uses this unit vector and the target variables $CV_T$ and $AV_T$ to produce a target vector for each of the control and auxiliary variables (process outputs) defining the changes in the target variables $CV_T$ and $AV_T$ over the time period defined by the prediction horizon time. A vector summer 84 then subtracts the compensated prediction vector for each of the control and auxiliary variables CV and AV (the process outputs) from the target vectors to define an error vector for each of the control and auxiliary variables CV and AV (the process outputs). The error vector for each of the control and auxiliary variables CV and AV is then provided to an MPC algorithm in a block 86 which operates in a standard manner to select the manipulated variable MV steps that minimize, for example, the least squared error, over the prediction horizon. Of course, the MPC algorithm block 86 may use an M by M process model or control matrix developed from relationships between the N control and auxiliary variables input to the MPC block 44 and the M manipulated variables output by the MPC block 44. These relationships are generally determined by inverting the control matrix used by the block 70, which inversion process is time consuming and difficult to regenerate during operation of the process 50.

Of course, the MPC algorithm block 86 may operate in any known manner to determine a set of manipulated variables to be delivered to the process 50 to drive the process outputs (the control and auxiliary variables CV and AV) to the desired set points $CV_T$ and $AV_T$. While the control block 86 is illustrated as including a square control matrix developed from a square process model, this need not be the case and, in fact a non-square control matrix can be used if so desired, it being understood that such a non-square control matrix is generally harder to determine due to the complex mathematical procedures needed to develop such a non-square control matrix. However, the control matrix used by the block 86 is generally developed from a linear process model, i.e., the one used in the block 70 and, thus, does not produce the exact manipulated or control signals that will drive the process outputs of the process 50 to the desired set points in the fastest manner. However, because the error signals developed and provided to the MPC algorithm block 86 do account for the non-linear nature of the process outputs because of the correction unit 78, the MPC algorithm block 86 will drive the process outputs to the desired set points in a manner that is generally acceptable.

Furthermore, if desired, the MPC block 44 may include or be run with an optimizer which optimizes the operation of the MPC block 44. One such optimizer is described in detail in U.S. patent application Ser. No. 10/241,350, entitled "Integrated Model Predictive Control and Optimization within a Process Control System," filed on Sep. 11, 2002, and published as Pub. No. US-2004-0049299-A1 on Mar. 11, 2004, which is assigned to the assignee hereof and the disclosure of which is hereby expressly incorporated by reference herein. Thus, it will be noted that the MPC block 44 may operate or function in any desired or known manner but incorporate the correction unit 78 to correct a predicted process output vector developed using a linear process model with a prediction signal developed by a non-linear process model or otherwise highly accurate process model, before such prediction vector is used to create one or more manipulated (control) signals to be used to control the process 50.

Figure 4:
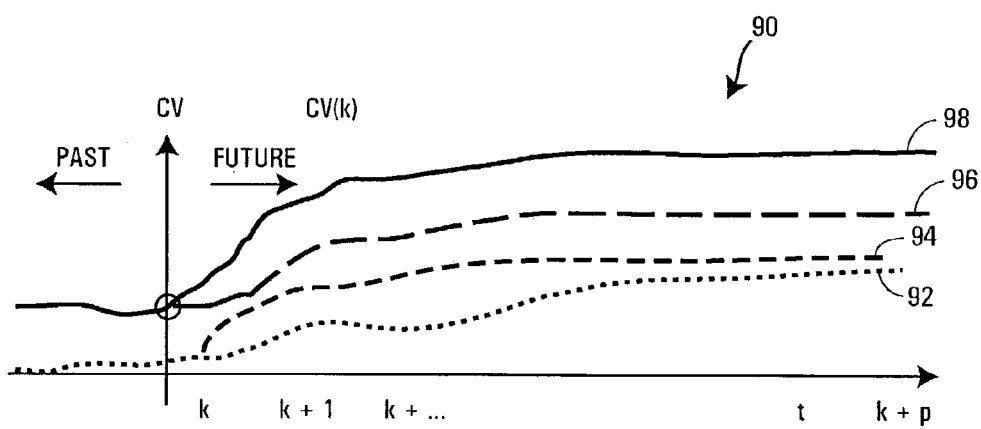
FIG. 4 is a graph illustrating a prediction vector developed by the model predictive control block of FIG. 3 at different stages of creation and compensation by a prediction signal developed by a non-linear process model.

FIG. 4 illustrates a graph 90 plotting the prediction vector (magnitude versus time) for one of the process outputs CV as this prediction vector is created and corrected in the linear process model 70 and the correction unit 78. Generally speaking, the line 92 of the graph 90 represents the prediction vector for the process output CV over time until the prediction time horizon (k+p) as developed during the last scan of the process (i.e., for the time k−1). At each controller scan or execution time k, the prediction vector 92 for the time k−1 is updated in three steps to produce a prediction vector for the time k, as represented by the line 94. In particular, the prediction vector 92 (made at the time k−1) is shifted one scan to the left to account for the time change from k−1 to k. Next, a step response, scaled by the current change on the process inputs which effect the process output CV is added to the shifted prediction vector 92 to produce the prediction vector 94. Next, the entire prediction vector 94 is shifted or moved to the point at the current time k to match the currently measured process output at the time k (for a filter coefficient equal to 1, or in general a prediction shift is applied to the prediction vector 94 as a function $Fw_k$) to produce the prediction vector 96. Normally, these steps are performed by the MPC prediction block 70 using the linear process model. However, if the process 50 is non-linear and a prediction signal for the process output CV based on the current process inputs is available, the prediction vector 96 is modified by the correction unit 78 using the available non-linear prediction signal to produce the corrected prediction vector 98.

In particular, if the prediction signal 60 from the non-linear process model 42 is a prediction vector, the correction unit 78 may simply replace the prediction vector 96 developed by linear modeling with the prediction signal 60 so that the prediction vector 98 is essentially the prediction signal 60 developed by non-linear process model 42. Such a non-linear prediction vector may be produced with a dynamic neural network process model (i.e., a non-linear process model). However dynamic neural network modeling is difficult to develop and is not commonly applied. If, on the other hand, the prediction signal 60 from the non-linear process model 42 is a steady state signal indicating the predicted steady state of the process output CV at the control time horizon assuming the current inputs to the process 50 remain the same, then the non-linear process model prediction signal 60 may be used to adjust the prediction vector 96 to produce the prediction vector 98 using any desired technique. It should be noted that, if the non-linear process model 42 is a neural network process model, the steady state value of the process output CV can be produced or developed by freezing the current neural network model inputs and developing the neural network model output at the end of the process time to steady state (e.g., control time horizon).

One method of modifying the prediction vector 96 developed by the linear process model 70 using the prediction signal 60 developed by the non-linear process model 42 is to set the value of the prediction vector 96 at the end of the prediction horizon equal to the predicted steady state value 60 and then to proportionally modify each of the other values of the prediction vector 96 based on the time of each such point. If ΔSS is a correction at the end of prediction horizon at the scan k+1, then correction in any point i in the future can be expressed as:

$$\Delta n_{k+1}(i) = \Delta nn_{k+1}(p-1)\left(1 - e^{\frac{is}{\tau}}\right)$$

where:

s is the scan period;

i is the scan number in the future (i is equal to or between 0 and p−1); and

τ is the assumed process output time constant, which may be taken as the largest step response time constant for the corrected output. If desired, τ may be a fraction of the time to steady state, such the time to steady state divided by 3 or 4.

Based on this equation, $\Delta \bar{n}_{k+1} = [\Delta n_{k+1}(0), \Delta n_{k+1}(1), \ldots, \Delta n_{k+1}(i), \ldots, \Delta n_{k+1}(p-1)]^T$ is a vector with the same dimension as $\bar{x}_{k+1}$ (defined below) accounting for the correction from the non-linear process model. Thus, $\Delta SS_{k+1} = \Delta nn_{k+1}(p-1) = nn_{k+1}(p-1) - y_{k+1}(p-1)$ where $\Delta SS_{k+1}$ is the correction at the end of prediction horizon. As will be understood for these equations, $nn_{k+1}(p-1)$ is future (steady state) output value developed by non-linear process model at the scan k+1;

$y_{k+1}(p-1)$ is the predicted value of the process output p−1 scans in the future as developed by the linear process model at the scan k+1; and $\bar{x}_{k+1}$ is the prediction vector for linear modeling developed at the scan k+1 where generally, $\bar{x}_k = [y_k(0), y_k(1), \ldots, y_k(i), \ldots, y_k(p-1)]^T$ is a vector of the process output prediction at a time k, for 0,1,2, ... p−1 steps ahead.

The prediction vector $\bar{x}_{k+1}''$ is the corrected prediction vector 98 (FIG. 4) which equals $\bar{x}_{k+1} + \Delta \bar{n}_{k+1}$. The correction at the present time be can be set as $\Delta n_{k+1}(0) = 0$ to match the current measurement of the process output CV and the predicted value at this time.

It will be understood from these equations that the prediction vector to be corrected for each of the process outputs includes a steady state value at a time horizon and that the correction modifies the prediction vector produced by the linear process model (such as in the MPC controller block) by adding to that prediction vector a difference between the predictions at the end of time horizon developed by the linear and the non-linear models multiplied by a first or higher order exponential function. In some embodiments, the first or higher order exponential function may use time constants equal to the process output time to steady state or, alternatively, may use time constants equal to some fraction of the process output time to steady state.

Alternatively, if process time constants are identified with a significant error, the prediction vector 96 can be corrected using process time to steady state $$\Delta n_{k+1}(i) = \Delta nn_{k+1}(p-1)\left(1 - e^{-\frac{ais}{TSS}}\right)$$

where TSS is time for the process steady state and $3 \leq \alpha \leq 5$

In general, higher order functions can be applied for developing a correction over the prediction horizon:

$$\Delta n_{k+1}(i) = \Delta nn_{k+1}(p-1)f(i,s,TSS)$$

where f (i,s,TSS) is a general exponential function higher than the first order that is used for prediction correction. As a general rule, it is advisable for the prediction correction to be the same order function as used for linear step responses for the considered output.

Each of these methods sets the intermediate prediction values (between the present time k and the time horizon k+p) in a way that preserves the dynamics of the response which, in turn, makes the modeling results compatible with Wiener and Hammerstein modeling. Of course, if desired, other manners of correcting the prediction vector developed by the linear process model 70 with the prediction signal 60 developed by the non-linear process model 42 can be used as well or instead of those described herein.

It will be understood that the method of correcting a model prediction vector developed using a linear process model with the output of a non-linear process model to compensate for non-linearities within a process as described herein is relatively easy and simple to implement during operation of the process without the need of a lot of computational processing to regenerate controller gains or non-linear model variables. It will also be understood that, because the MPC block 44 is still using a linear process model, the control outputs are not exactly configured to optimally drive the process 50 so that the process outputs reach the desired target values. However, because the process output prediction vectors are updated using the non-linear process model 42 after each scan, or periodically throughout operation of the process, i.e., after each n scans (where n can be any desired number), the MPC control matrix 86 will produce control signals that cause the process outputs to converge to the desired or target values relatively quickly despite the non-linearities within the process 50.

It will also be understood that, for the prediction signal 60 developed by the non-linear process model 42 to be applied correctly, this prediction signal should be developed for the same set of inputs used to develop the prediction vector at the output of the linear model block 70. Assuring that the non-linear process model 42 and the MPC block operation are synchronized is an important detail and care should be taken so that the future or predicted outputs of these blocks are not shifted one scan with respect to one another. Thus, it is preferred that the block execution order includes executing the non-linear process model 42 before executing the MPC block 44 so that the prediction signal 60 is available when the process model 70 for the MPC block 44 is executed.

If the non-linear process model 42 is a neural network process model, filtering for neural network future prediction can be applied in a similar way as for the prediction shift. In particular, the modeling linear equation could be modified in the following way:

$$\bar{x}_{k+1}{}^n = A\bar{x}_k + B\Delta\bar{u}_k + F\bar{w}_k + f\Delta\bar{n}_k$$

$$y_0 = C\bar{x}_{k+1}{}^n$$

or $$\bar{x}_{k+1}{}^n = \bar{x}_{k+1} + f\Delta\bar{n}k$$

$$y_0 = C\bar{x}_{k+1}{}^n$$

where:

A, B, C are process model matrices $0 \leq F \leq 1$ is the filter for unmeasured disturbances correction and $0 \leq f \leq 1$ is the filter for neural network correction.

Of course, modifications of the above equations can be applied as well.

Figure 5:
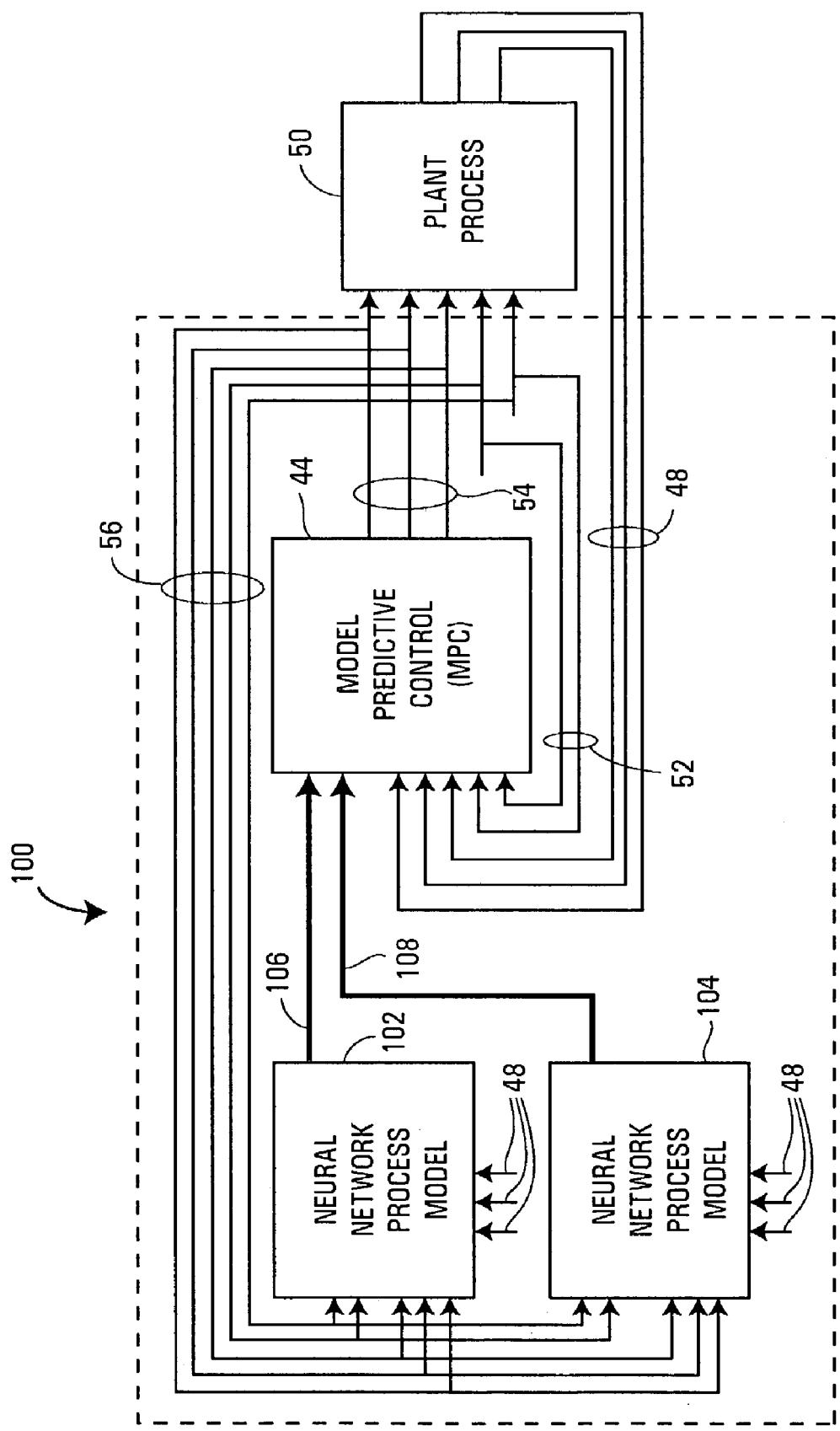
FIG. 5 is a block diagram of an advanced control system having a model predictive control block and multiple neural network process models connected within a process control routine to control a process.

FIG. 5 illustrates a further advanced control system 100 coupled to the process 50. The advanced control system 100 includes an MPC block 44 and two neural network process models 102 and 104, each of which produces a prediction signal 106 or 108 that are provided to the MPC block 44. Similar to the MPC block 44 of FIG. 2, the MPC block 44 receives the process outputs 48 and the disturbance and constraint variables 52 as inputs thereto and operates generally as discussed above with respect to the configuration of FIG. 3. Likewise, each of the neural network process models 102 and 104 receives as inputs 56, the control and manipulated input signals 54 and the disturbance and constraint variables 52. The neural network process models 102 and 104 are trained in any standard or known manner and are of standard neural network design to model or predict one of the outputs of the process 50 based on the inputs thereto. Generally speaking, the outputs 106 and 108 may be prediction vectors for the respective process output or may be steady state prediction values that predict the steady state value of the process output assuming the inputs to the process model 102 or 104 remain the same.

As will be understood, the MPC block 44 uses each of the prediction signals 106 and 108 to separately correct or compensate different prediction vectors within the MPC block 44 in the manner generally described above with respect to the signal 60 in the embodiment of FIGS. 3 and 4. Furthermore, while two neural network process models are illustrated in FIG. 5, any other number of neural network process models could be used to produce any number of prediction signals for the different process outputs that exhibit non-linearities with respect to one or more process inputs. Generally speaking, a separate neural network process model will be provided for each different process output which has a non-linear characteristic. However, this need not necessarily be the case.

Figure 6:
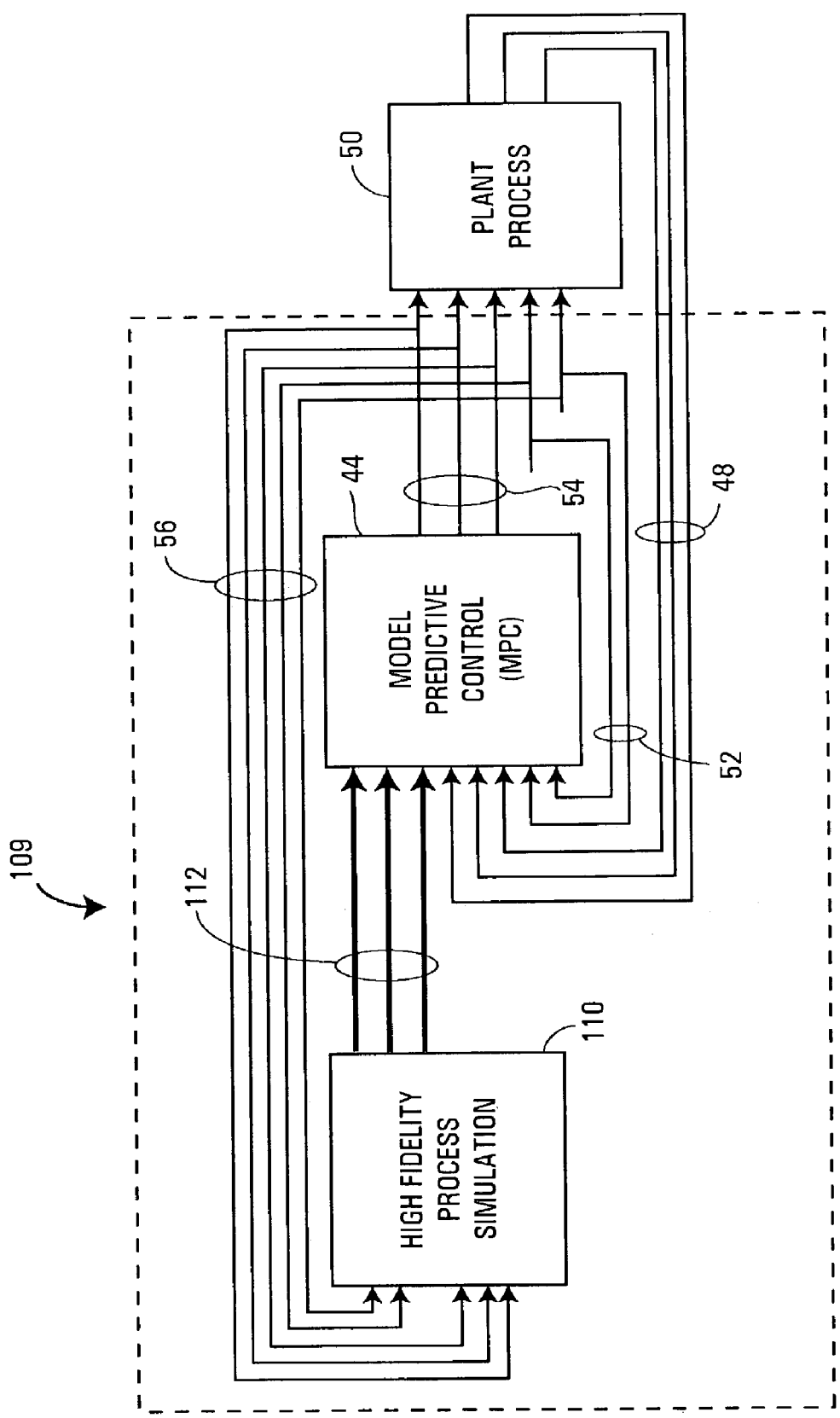
FIG. 6 is a block diagram of an advanced control system having a model predictive control block and an advanced or high fidelity process model connected within a process control routine to control a process.

FIG. 6 illustrates a further embodiment of an advanced control system 109 including an MPC block 44 and a high fidelity process model or simulation 110 such as that provided by HYSYS™, Cape™ or any other high fidelity process model. Such a high fidelity process model 110 may be a multiple-input/multiple-output process model, a multiple-input/single-output process model (linear or non-linear) based on first principles, neural network logic, fuzzy logic or any other logic that produces a prediction signal for one or more of the process outputs based on the process inputs. As will be understood, the MPC block 44 uses each of the different prediction signals to correct or compensate different prediction vectors for the process outputs as developed by the MPC prediction block 70 of FIG. 3. Also, while FIG. 6 illustrates that the high fidelity process model 110 produces three prediction signals, the high fidelity process model 110 could produce any other number of prediction signals for use by the MPC block 44, with the exact number generally being dependent on the number of process outputs that exhibit a non-linear response to one or more of the process inputs.

Figure 7:
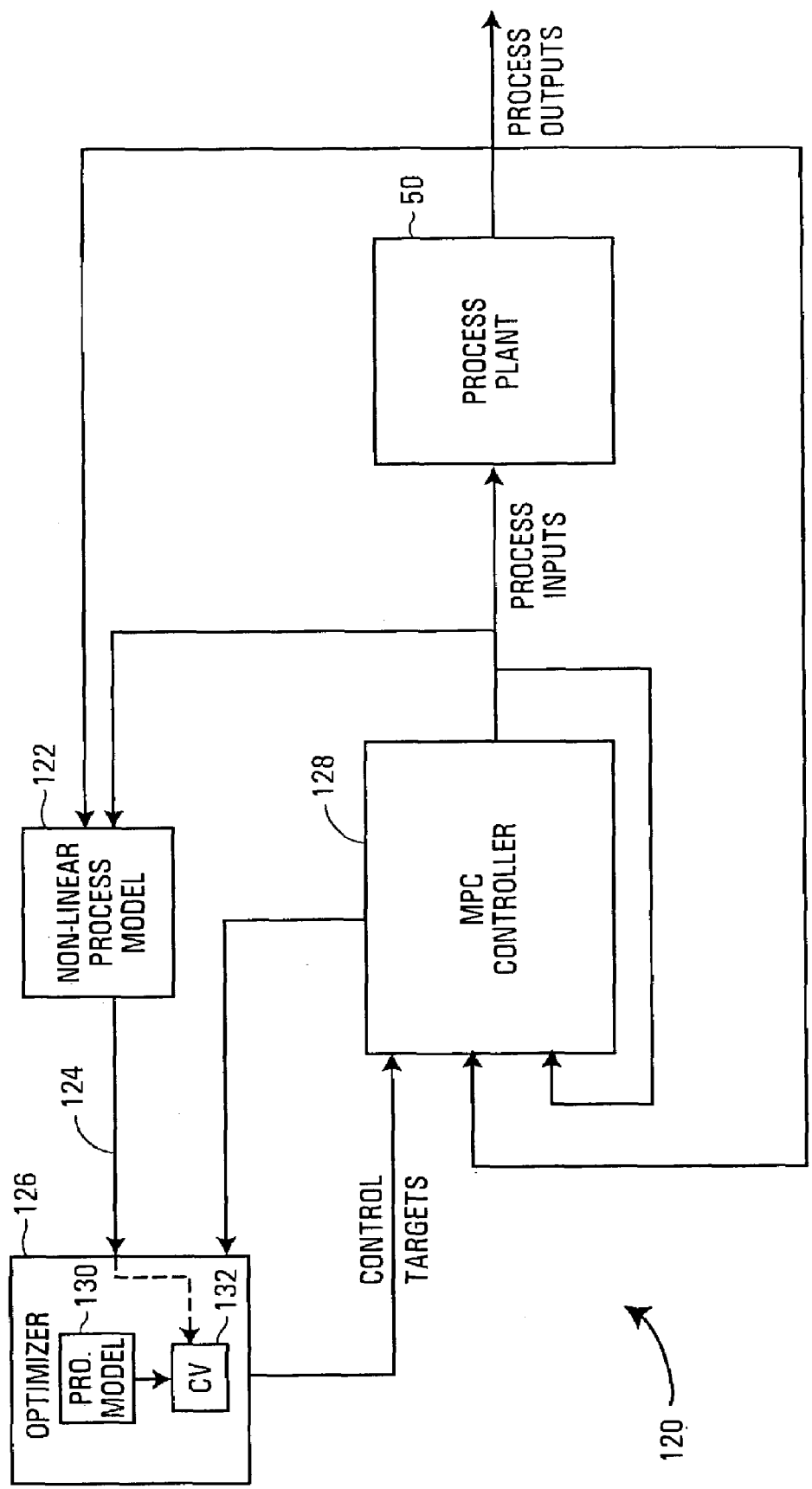
FIG. 7 is a block diagram of an advanced control system having an optimizer block, a controller and a neural network process model connected within a process control routine to control a process.

FIG. 7 illustrates a further embodiment of an advanced control system 120 in which a non-linear process model 122 produces a prediction signal 124 for a process output and provides the prediction signal 124 to an optimizer 126 which, in turn, uses the an internal linear process model and the prediction signal 124 to produce one or more control target outputs that are delivered to and used by a controller 128, which may be an MPC controller, to develop a set of control signal for use in controlling the process plant 50. It will be understood that the optimizer 126 includes a linear process model 130 that models the process 50 and that is used, in any standard or known manner, to produce one or more process output prediction vectors which are then corrected or compensated in a correction unit 132 using the prediction signal 124 and that such corrected prediction vectors are then used to generate or develop the control target signals (desired control signals) for use in driving the controller 128. Such correction or compensation may be performed in a manner similar to any of those manners described above with respect to FIGS. 3 and 4 or in any other desired manner. The optimizer 126 may be any desired type of optimizer including, for example, the optimizer disclosed in U.S. patent application Ser. No. 10/241,350 discussed above. It will be understood that the optimizer 126 is part of the multiple-input/multiple-output control routine having an additional controller 128 that receives indications of the process outputs developed by the process plant 50.

Furthermore, it will be understood that the technique of using a prediction signal developed by a highly accurate or non-linear process model to correct or compensate a prediction vector produced by a linear process model to compensate for process non-linearities may be used in any other controller component besides a controller routine and an optimizer routine, as specifically described herein.

While the advanced control blocks 38, 100, 109 and 120 have been illustrated herein as a separate function block having an MPC block 44 or 128 and one or more separate process model blocks 42, 102, 104, 110 122, the advanced control block 38 maybe implemented simply by communicatively interconnecting an MPC block and one or more process model blocks, each of which could be separate function blocks. Alternatively, if desired, the process models 42, 102, 104, 110 and 122 described herein may be incorporated into or be a part of the MPC block 44 or 128. Furthermore, while the advanced control blocks or systems 38, 100, 109 and 120 are described herein as including an MPC block as a multiple-input/multiple-output control block, other multiple-input/multiple-output control blocks may be used instead, such as fuzzy logic control blocks, optimizer blocks or any other control routines or part of control routines that use a linear process model to develop control signals for a process.

As will be understood, the MPC or advanced control logic routines and methods described herein enable a user to create advanced control blocks such as MPC control blocks that can be used in processes having non-linear properties without having to integrate a non-linear process model within the standard linear MPC logic. Thus, this system enables known and relatively simple to implement non-linear process models, such as neural network process models, to be used to correct a linear MPC operation to provide better control in non-linear processes with relatively small effort, simple implementation within a process control routine, flexibility and minimal intrusion into the MPC control logic.

While the advanced control blocks have been described herein as being used in conjunction with Fieldbus and standard 4-20 ma devices, they can, of course, be implemented using any other process control communication protocol or programming environment and may be used with any other types of devices, function blocks or controllers. Moreover, it is noted that the use of the expression "function block" herein is not limited to what the Fieldbus protocol or the DeltaV controller protocol identifies as a function block but, instead, includes any other desired type of block, program, hardware, firmware, etc., associated with any type of control system and/or communication protocol that can be used to implement some process control function. Also, while function blocks typically take the form of objects within an object oriented programming environment, this need not be case.

Although the advanced control blocks and associated MPC blocks and non-linear process models described herein are preferably implemented in software, they may be implemented in hardware, firmware, etc., and may be executed by any other processor associated with a process control system. Thus, the routines 38, 42, 44, 100, 102, 104, 109, and 110 described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium). Additionally, different portions of this software may be separately implemented on different processors and/or within different devices, if so desired.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control element for use as a portion of a process control routine implemented on a processor to control a process that includes a set of process outputs effected by a set of process control input signals, the process control element comprising:
    a computer readable memory; and
    a control element stored on the computer readable memory which when executed on the processor implements multiple-input/multiple output control of the process, the control element including;
        a first process model which receives the set of process control input signals to produce a prediction signal for one of the process outputs; and
        a multiple-input/multiple-output control element which receives an indication of the process outputs to develop a set of control signals,
        the multiple-input/multiple-output control element including a second process model that develops a prediction vector for multiple process outputs including the one of the process outputs and a correction unit coupled to an output of the first process model to receive the prediction signal for the one of the process outputs and coupled to an output of the second process model to receive the prediction vector for the one of the process outputs and that modifies the prediction vector for the one of the process outputs using the prediction signal for the one of the process outputs to produce a corrected prediction vector for the one of the process outputs.

2. The process control element of claim 1, wherein the first process model is a non-linear process model.

3. The process control element of claim 1, wherein the second process model is a linear process model.

4. The process control element of claim 1, wherein the first process model is neural network process model.

5. The process control element of claim 4, wherein the multiple-input/multiple-output control element is a model predictive control controller and wherein the set of control signals are delivered as the process control inputs signals to control the process outputs.

6. The process control element of claim 4, wherein the multiple-input/multiple-output control element is an optimizer and wherein the set of control signals includes targets for a process controller.

7. The process control element of claim 1, wherein the first process model is a non-linear process model and the second process model is a linear process model.

8. The process control element of claim 7, wherein the first process model produces a second prediction vector for the one of the process outputs as the prediction signal and the correction unit modifies the prediction vector produced by the second process model by replacing the prediction vector with the second prediction vector.

9. The process control element of claim 7, wherein the first process model produces a steady state value for the one of the process outputs as the prediction signal and the correction unit modifies the prediction vector produced by the second process model by combining the steady state value for the one of the process outputs with the prediction vector for the one of the process outputs.

10. The process control element of claim 9, wherein the prediction vector for the one of the process outputs includes a steady state value at a time horizon and wherein the correction unit modifies the prediction vector produced by the second process model by adding to the prediction vector produced by the second process model a difference between first and second model predictions at the end of time horizon multiplied by a first or higher order exponential function.

11. The process control element of claim 9, wherein the prediction vector for the one of the process outputs includes a steady state value at a time horizon and wherein the correction unit modifies the prediction vector produced by the second process model by adding to the prediction vector produced by the second process model a difference between first and second model predictions at the end of time horizon multiplied by a first or higher order exponential function with time constants equal to a fraction of the process output time to steady state.

12. The process control element of claim 1, wherein the first process model produces a second prediction vector for the one of the process outputs as the prediction signal and the correction unit modifies the prediction vector produced by the second process model by replacing the prediction vector with the second prediction vector.

13. The process control element of claim 1, wherein the first process model produces a steady state value for the one of the process outputs as the prediction signal and the correction unit modifies the prediction vector produced by the second process model by combining the steady state value for the one of the process outputs with the prediction vector for the one of the process outputs.

14. The process control element of claim of claim 13, wherein the prediction vector for the one of the process outputs includes a steady state value at a time horizon and wherein the correction unit modifies the prediction vector produced by the second process model by multiplying the prediction vector produced by the second process model by a component using a ratio of the steady state value for the one of the process outputs and the steady state value at the time horizon of the prediction vector for the one of the process outputs.

15. The process control element of claim of claim 13, wherein the prediction vector for the one of the process outputs includes a steady state value at a time horizon and wherein the correction unit modifies the prediction vector produced by the second process model by multiplying the prediction vector produced by the second process model by a component using a difference between the steady state value for the one of the process outputs and the steady state value at the time horizon of the prediction vector for the one of the process outputs.

16. A method of controlling a process having a set of process outputs effected by a set of process control inputs, the method comprising:
    using a first process model to develop a prediction vector for one or more of the process outputs;
    using a second process model to produce a prediction signal for one of the process outputs using the set of process control signals;
    providing the prediction vector and the prediction signal as inputs to a correction unit;
    correcting the prediction vector for the one of the process outputs in the correction unit using the prediction signal for the one of the process outputs to produce a corrected prediction vector; and
    using the corrected prediction vector to produce a set of control signals for use in controlling the process.

17. The method of claim 16, wherein using the first process model includes using a first linear process model as part of a multiple-input/multiple-output control routine that receives an indication of the process outputs and wherein using the corrected prediction vector includes using the multiple-input/multiple-output control routine to produce the control signals to be delivered to the process control inputs from the corrected prediction vector.

18. The method of claim 17, wherein using the first linear process model as part of a multiple-input/multiple-output control routine includes using a model predictive control routine as the multiple-input/multiple-output control routine.

19. The method of claim 17, wherein using the second process model includes using a non-linear process model.

20. The method of claim 19, wherein using the second process model includes using a neural network process model.

21. The method of claim 20, wherein using the second process model includes producing a steady state prediction value of the process output as the prediction signal.

22. The method of claim 20, wherein using the second process model includes producing a high-fidelity prediction vector for the process output as the prediction signal.

23. The method of claim 16, wherein using the second process model includes producing a steady state value for the one of the process outputs as the prediction signal and wherein correcting the prediction vector includes modifying the prediction vector produced by the first process model by combining the steady state value for the one of the process outputs with the prediction vector for the one of the process outputs.

24. The method of claim 23, wherein using the first process model includes producing the prediction vector for the one of the process outputs to include a steady state value at a time horizon and wherein modifying the prediction vector includes adding to the prediction vector a difference between the steady state value at the time horizon of the prediction vector and the prediction signal at the time horizon multiplied by a first or higher order exponential function.

25. The method of claim 23, wherein using the first process model includes producing the prediction vector for the one of the process outputs to include a steady state value at a time horizon and wherein modifying the prediction vector includes adding to the prediction vector a difference between the steady state value at the time horizon of the prediction vector and the prediction signal at the time horizon multiplied by a first or higher order exponential function with time constants equal to a fraction of the process output time to steady state.

26. The method of claim 16, wherein using the first process model includes using a first linear process model as part of a control optimizer that receives an indication of the process outputs and wherein using the corrected prediction vector includes using the control optimizer to produce a set of target signals for a controller using the corrected prediction vector.

27. A process controller for use in controlling a process having a set of process outputs effected by a set of process control input signals, the process controller comprising:
    a multiple-input/multiple output controller that receives an indication of the process outputs and develops the set of process control input signals, the multiple-input/ multiple-output controller including a first process model that develops a prediction vector for one of the process outputs;

a second process model that receives the set of process control input signals to produce a prediction signal for the one of the process outputs; and a correction unit coupled to an output of the first process model to receive the prediction vector for the one of the process outputs and coupled to an output of the second process model to receive the prediction signal for the one of the process outputs and that modifies the prediction vector for the one of the process outputs using the prediction signal for the one of the process outputs to produce a corrected prediction vector for the one of the process outputs.

28. The process controller of claim 27, wherein the second process model is a non-linear process model.

29. The process controller of claim 27, wherein the first process model is a linear process model.

30. The process controller of claim 27, wherein the second process model is neural network process model.

31. The process controller of claim 27, wherein the multiple-input/multiple-output controller is a model predictive control controller.

32. The process controller of claim 31, wherein the second process model is a non-linear process model.

33. The process controller of claim 32, wherein the second process model is a neural network process model.

34. The process controller of claim 27, wherein the first process model is a linear process model and the second process model is a non-linear process model.

35. The process controller of claim 34, wherein the second process model produces a second prediction vector for the one of the process outputs and the correction unit modifies the prediction vector produced by the first process model by replacing the prediction vector with the second prediction vector.

36. The process controller of claim 34, wherein the second process model produces a steady state value for the one of the process outputs as the prediction signal and the correction unit modifies the prediction vector produced by the first process model by combining the steady state value for the one of the process outputs with the prediction vector for the one of the process outputs.

37. The process controller of claim 36, wherein the prediction vector for the one of the process outputs includes a steady state value at a time horizon and wherein the correction unit modifies the prediction vector produced by the first process model by adding to the prediction vector produced by the first process model a difference between first and second model predictions at the end of time horizon multiplied by a first or higher order exponential function.

38. The process controller of claim 36, wherein the prediction vector for the one of the process outputs includes a steady state value at a time horizon and wherein the correction unit modifies the prediction vector produced by the first process model by adding to the prediction vector produced by the first process model a difference between first and second model predictions at the end of time horizon multiplied by a first or higher order exponential function with time constants equal to a fraction of the process output time to steady state.

* * * * *

UNITED STATES PATENT AND TRADEMARK OFFICE
CERTIFICATE OF CORRECTION

PATENT NO. : 7,272,454 B2 Page 1 of 1
APPLICATION NO. : 10/454937
DATED : September 18, 2007
INVENTOR(S) : Wilhelm K. Wojsznis et al.

It is certified that error appears in the above-identified patent and that said Letters Patent is hereby corrected as shown below:

At Column 13, line 24, "$\overline{x}_{k+1}{}^{n}$" should be -- $\overline{x}^{n}_{k+1}$ --.

At Column 13, line 26, "$C\overline{x}_{k+1}{}^{n}$" should be -- $C\overline{x}^{n}_{k+1}$ --.

At Column 13, line 29, "$\overline{x}_{k+1}{}^{n}$" should be -- $\overline{x}^{n}_{k+1}$ --.

At Column 13, line 31, "$C\overline{x}_{k+1}{}^{n}$" should be -- $C\overline{x}^{n}_{k+1}$ --.

Signed and Sealed this

Third Day of June, 2008

JON W. DUDAS
*Director of the United States Patent and Trademark Office*